United States Patent Office 3,052,134
Patented Sept. 4, 1962

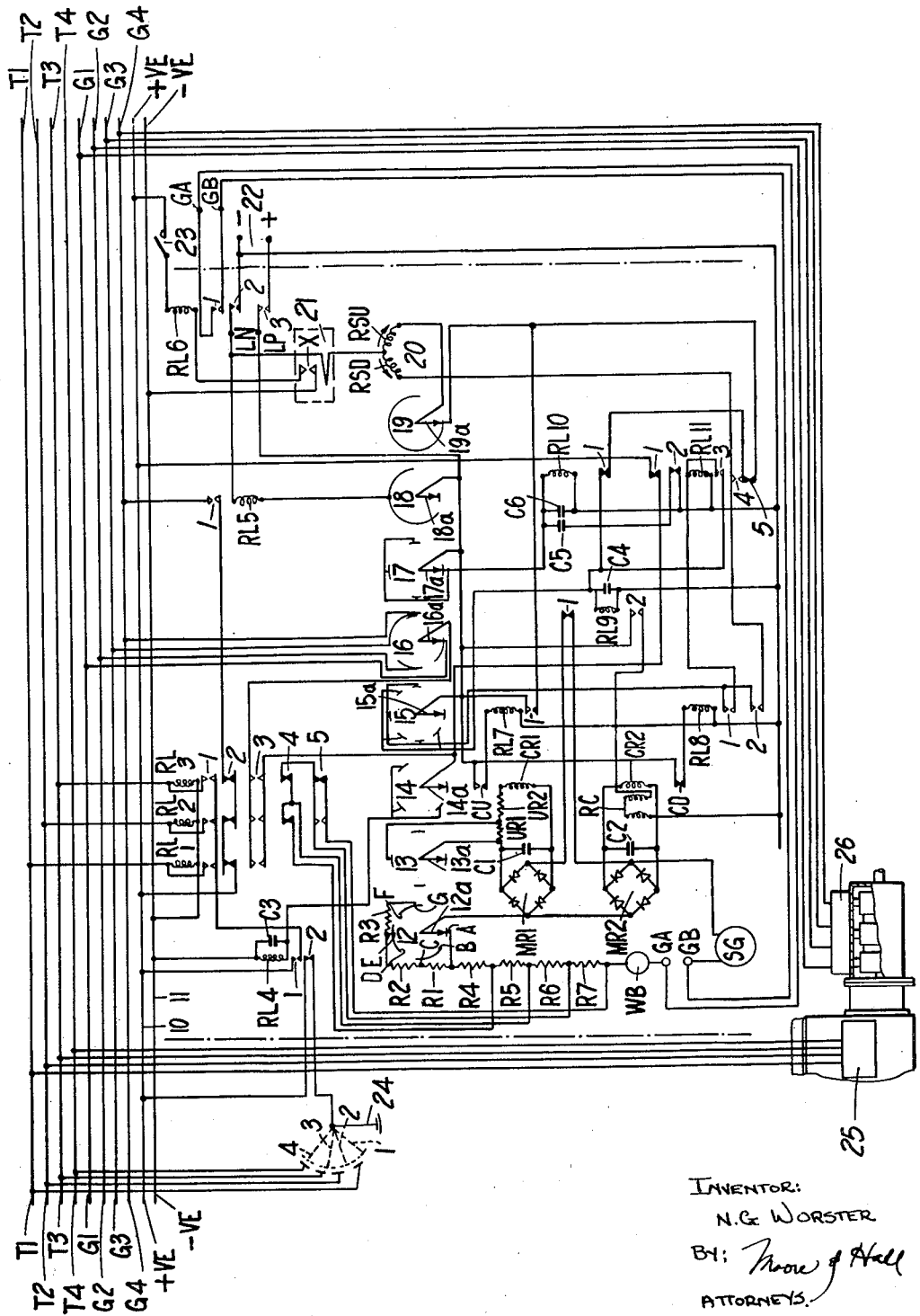

3,052,134
AUTOMATIC GEAR CHANGE CONTROLS
Norman George Worster, Elstree, Hartfordshire, England, assignor, by mesne assignments, to S. Smith & Sons (England) Ltd., London, England, a corporation of Great Britain
Filed Jan. 14, 1959, Ser. No. 786,756
Claims priority, application Great Britain Jan. 16, 1958
10 Claims. (Cl. 74—472)

This invention relates to controls for automatically operated variable ratio gear mechanisms, and has an important but not exclusive application in diesel trains, particularly of the kind having a number of power units in different coaches, the variable ratio gear mechanism preferably being of the epicyclic gear type in which gear changes are performed by applying brakes to various elements of the epicyclic gear trains, or by clutching together elements of the trains, or by both brakes and clutches.

According to the present invention there is provided an automatic gear change control for a transmission which includes a variable ratio gear mechanism providing at least three ratios, which control comprises means for generating a signal which varies with the rotational speed of the output shaft of the transmission, means responsive to the signal and arranged to actuate the changes of gear ratio in dependence on the value of the signal, means for altering, consequent upon actuation of a gear change, the relationship between the signal and the speed of the output shaft, in the sense that, to provide a given value of the signal, the output shaft must rotate at a higher speed after an "upward" change than before the change, and must rotate at a lower speed after a "downward" change than before the change, and said responsive means being re-set to its original condition consequent upon its having actuated a gear change and after said alteration of the relationship between the signal and the speed of the output shaft.

By an "upward" gear change is meant a change of gear resulting in an increase in the ratio of the speed of the output shaft, to that of the input shaft, and by a "downward" gear change is meant a change of gear resulting in a decrease in the ratio of the speed of the output shaft to that of the input shaft.

In preferred arrangements the signal is derived from an electric generator arranged to be driven from the output shaft of the transmission so that the output, of the generator affords a signal which is representative of the speed of the output shaft, and the means responsive to the signal may comprise electrical relay means connected in circuti with the generator, the relationship between the value of the signal and the speed of the output shaft being altered by automatically varying the resistance in the circuit consequent upon the actuation of a gear change. In one such arrangement the control includes a number of multi-position switches actuated by the signal responsive means and arranged to control the sequence of operations necessary for a change of gear ratio, said switches being operated in concert, and wherein alternate positions of the switches actuate re-setting of the signal responsive means and the other alternate positions initiate changes of gear, one of said switches being arranged to alter the resistance in the generator circuit just before the re-setting of the signal responsive means.

The switches may be operated by a step-by-step mechanism the actuation of which to make a change of gear ratio is initiated by swtich contacts under the control of said electrical relay.

According to a feature of the invention the automatic control may be provided in combination with a power unit driving the input shaft of the gear mechanism and having an operator actuated power control member, the relationship between the signal and the speed of the output shaft of the transmission being also altered according to the setting of the operator actuated control, settings giving greater power being arranged to cause alteration of the relationship in a sense to cause all the gear changes to be actuated at higher speeds of the output shaft as compared with settings for lower power. Alteration of the operator actuated control setting may be arranged to cause alteration of the resistance in said circuit. In the preferred arrangement this is accomplished by providing a number of definite settings for the operator-actuated control are provided, successive settings in the sense of increasing the power placing in circuit with the generator and signal responsive means respective increments of resistance, which are successively cut out of the circuit as the settings are changed in the sense of reducing the power.

In this arrangement the different throttle settings are arranged to energise respective relays or combinations of relays which control contacts serving to cut the appropriate resistances into and out of the circuit with the generator.

The following is a description of one embodiment of the invention as applied to a variable ratio epicyclic gear box for a diesel train having a number of power units and associated gear mechanisms in different coaches and the description makes reference to the accompanying drawing which shows a circuit diagram of the arrangement.

Referring to the drawing there are provided electric lines T1, T2, T3 and T4 which represent four throttle openings and are selected by the driver by means of the manual throttle controller 24. Lines 10 and 11 are positive and negative lines respectively which are always energised.

Electro-hydraulic valves (not shown) are provided for controlling the throttle positions for the various power units and are under the control of lines T1–T4 respectively. The gear boxes associated with the various power units are of the epicyclic type in which a change of gear is accomplished by means of brake bands and clutches in known manner. Each gear box provides four forward speeds and the bands are operated by pneumatic or hydraulic motors controlled by electrically operated valves which are not shown and the selection of gears is by energisation of the respective lines G1–G4 from the positive line 10 under the control of a selector switch 16 to control electric operation of the associated valves. Selector switch 16 which is of the sliding contact type and has a contact arm 16a, is one of eight selector switches numbered 12–19 in the drawing which are arranged in the form of a bank or are provided by a drum controller. Switches 12–19 have respective contact arms 12a–19a, the latter being linked together to move in concert under the control of a step by step rotation mechanism 20 which causes rotation of the contact arms through an angle of 45° at each step. The step by step rotation is accomplished by energisation of electromagnet coils RSD and RSU, the electro-magnets acting through pawls or the equivalent. Energisation of electromagnet coil RSU causes a rotation of the contact arms through an angle of 45° in a clockwise direction and actuation of electro-magnet coil RSD causes a rotation of 45° in an anti-clockwise direction. In the position shown in the drawing first gear is engaged and subsequent rotations of the contact arm through 90° in a clockwise direction engages second, third and fourth gears in sequence. The arms therefore rotate through 270° from the position shown.

Actuator relays RL1 to RL11 are provided for purposes which will become clear from the description of the mode of operation of the arrangement. In the drawing the various contacts are shown aligned with the respective relays which control them and the sets of contacts associated with each relay are numbered consecutively. In the following description RL1/1 and RL1/2 represent respectively first and second sets of contacts under the control of relay RL/1; RL2/1 and RL2/2 represent first and second sets of contacts under the control of relay RL2, and so on.

An alternating current speedometer generator SG is driven from the driving wheels of the train and is in circuit through contacts GA, GB, resistances R4–R7, and contact arm 12a, with rectifiers MR1 and MR2 which are in parallel with each other and which are respectively connected to calibrated relays CR1 and CR2. Generator SG thus provides a signal representing the speed of the vehicle and the signal causes actuation of upward gear changes through relay CR1 and actuation of downward gear changes through relay CR2. Adjustment box WB is provided to permit adjustment of the characteristics of the circuit for different wheel diameters.

Switch 21 is an automatic/manual control switch which is combined with a thermal delay trip.

In addition to the positive and negative lines 10, 11, a local D.C. supply is connected to terminals 22.

The throttle energisation lines T1 to T4 and the gear selection lines G1 to G4 are respectively connected to the usual throttle circuit 25 and the gear selection circuit 26 respectively.

In this arrangement the reverse gear is selected by a separate mechanism (not shown).

In the condition shown in the diagram the vehicle is at rest with the local D.C. supply switched off.

The operational sequence is as follows:

(1)
 (i) Driver's key closes switch 23 and connects positive line 10 to relay RL6.
 (ii) Driver's throttle controller 24 is placed in the idling position as shown.
 (iii) Engine is started.

(2)
 (i) Switch 21 is set to "automatic" to close contacts X and connect negative line 11 to relay RL6. Energisation of RL 6 closes contacts RL6/1, RL6/2 and RL6/3 to connect local positive and negative voltage supply in circuit and to connect the speedometer generator SG in circuit via contact GA, GB.
 (ii) Relay RL10 is energised, opening contacts RL10/1.

(3)
 (i) Driver's throttle controller 24 is moved to position 1.
   Relay RL1 is energised via contact RL4/2, connecting the train's positive line 10 to line G1 via contact RL11/1, RL1/3 and selector 5. Energisation of line G1 actuates the gear selection circuit to engage first gear, and the train moves off.

(4)
 (i) Throttle controller 24 is moved to its position 2, and energises relays RL1 and RL2. Contacts RL2/4 modify calibration of speed sensing circuit by introducing resistor R5. In throttle position 3 both relays RL2 and RL3 are energised whilst in position 4 only RL3 is energised. In any particular throttle setting the calibration of the speed sensing circuit is modified for the appropriate gear change speed by the various combinations of contacts RL2/4 and 5, RL3/4 and 5, and resistors R5, R6 and R7.

(5)
 (i) When the track speed has increased to an appropriate gear change speed, calibrated relay CR1 operates closing contacts CU and energising relay RL7. Contacts RL7/1 energise the "up-sensing" rotary selector RSU via selector switch 19.
 (ii) All the selectors arms move from position A to B as shown on switch 12.
 (iii) Selector 12 in position B modifies the calibration of the speed sensing circuit appropriate for the next gear change speed.
 (iv) Selector 14 in position B energises relay RL4 and contacts RL4/2 de-energise the throttle wires T1, T2, T3 or T4. Contacts RL4/1 maintain the energisation of appropriate throttle relay RL1, RL2 or RL3 via contacts RL1/1, RL2/1 or RL3/1. This operation allows the engine revolutions to fall before engaging the next upward gear change.
 (v) Selector 15 in position B energises relay RL9. Contacts RL9/1 reset relay CR1 by opening circuiting its A.C. input and contacts RL9/2 set, or arm relay CR2 by energising the reset coils RC.
 (vi) Selector 16 in position B maintains supply to gear EPV, G1.
 (vii) Selector 18 in position B de-energises RL5 to close contacts RL5/1.
 (viii) Selector 17 in position B de-energises relay RL10 which after a short time delay, determined by the value of capacitors C5 and C6, falls off and applies a second pulse to RSU via contacts RL10/1, and selectors 15 and 19.
 (ix) All selector arms 12a to 19a move from position B to C.
 (x) Selector 14 in position C de-energises relay RL4 which after a short time delay, determined by capacitor C3, falls off and re-energises the appropriate throttle line.
 (xi) Selector 15 disconnects energisation of relay RL9 and disconnects supply to RSU via contacts RL10/1.
 (xii) Selector 16 in position C de-energises first gear energisation line G1 and energises second gear energisation line G2.
 (xiii) Selector 17 in position C energises relay RL10 opening contacts RL10/1.

The train is now being driven in second gear.

(6)
The second upward gear change from second to third gear is identical to the first change with the exception that selector 13 will modify the calibration of relay CR1 by short-circuiting resistor UR2, in addition to the modification of the calibration by selector 12 in connecting R2 into the circuit.

The third gear change is also identical to the first change with the exception that selector 19 in position G is effectively disconnected to prevent any further pulse due to high track speed from energising the rotary selector 20 after top gear has been engaged.

(7)
A downward gear change can occur at the selector positions G, E or C.
 (i) When the track speed falls to a value appropriate to throttle setting calibrated relay CR2 operates, closing contacts CD to energise RL8.
 (ii) Closure of contacts RL8/1 energises the change-over relay RL11 and contacts RL8/2 energise the "down-sensing" rotary coil RSD.
 (iii) All selector arms 12a and 19a through 45° in an anti-clockwise direction to positions F, D or B.
 (iv) Contacts RL11/1 open and prevent relay RL4 from being energised by selector 14 and also de-energise the gear energisation lines G1, G2, G3 or G4 in order to allow engine revolutions to rise before selecting a lower gear position.

(v) Contacts RL11/2 disconnect capacitor C5 to reduce the time delay of the fall-off of relay RL10.

(vi) Contacts RL11/3 maintain the energisation of relay RL11 via selector 4 during the whole period of a downward gear change.

(vii) Selector 15 in positions G, E or C breaks the supply to contacts RL8/1 and 2, and hence to rotary coil RSD.

(viii) Selector 15 in positions F, D or B, energises RL9 to reset cailbrated relay CR2 by energising the re-setting coils RC.

(ix) Selector 17 de-energises RL10 which after a short time delay, due to capacitor C6, falls off and energises rotary coil RSD to move the selector arms a further 45° in an anti-clockwise direction to positions E, C or A.

(x) Selector 12 modifies the calibration of the speed sensing circuit and since this is carried out on the second pulse to the rotary selector a time delay is required on relay RL9 and is provided by C4.

(xi) Selector 15 breaks the supply to relays RL9 and RL11 via contacts RL11/3.

(xii) Selector 17 re-energises RL10 and the circuit is back to the condition as after an upward gear change.

(8)

(i) If the train is any gear setting, other than first and the driver's throttle controller 24 is set to idling, contacts RL1/2, RL2/2 and RL3/2 all close to energise fourth-gear energisation line G4 via contacts RL5/1. At the same time contacts RL1/3, RL2/3 and RL3/3 open to de-energize all other gear lines G1–G3. With an increase or decrease in track speed the calibrated relays will continue to function normally selecting the appropriate gear on selector 16 although maintaining the current supply to line G4.

(ii) When track speed falls to a value which would normally energise first gear G1, selector 18 de-energises relay RL5 and G4 is de-energised by contacts RL5/1. The train is then in neutral.

(iii) If the driver's throttle is opened to positions 1, 2, 3 or 4 before this latter position is reached then the appropriate gear will be selected relative to the track speed and throttle setting.

(9)

The circuit will inherently detect wheel slip since the speedometer generator is coupled to a driving wheel and if slip is of a sufficient order will cause an upward gear change to reduce the driving torque to overcome slip.

(10)

The thermal overload trip on switch 22 is included as a safety precaution in the event of failure of relay CR2 which will energise relay RL8 and permanently energise the rotary selector coils. After a delay of approximately 10 seconds the trip breaks the local D.C. supply to the gear change circuit. Other failures may have minor effects on the circuit but will not affect the throttle and gear E.P. valves fed by the train wires T1–T4 and G1–G4.

While there has been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

I claim:

1. An automatic gear change control for a transmission which includes a variable ratio gear mechanism providing at least three ratios, which control comprises means for generating a signal which varies with the rotational speed of the output shaft of the transmission, means responsive to the signal and arranged to actuate the changes of gear ratio in dependence on the value of the signal, means for altering, consequent upon actuation of a gear change, the relationship between the signal and the speed of the output shaft, in the sense that, to provide a given value of the signal, the output shaft must rotate at a higher speed after an "upward" change than before the change, and must rotate at a lower speed after a "downward" change than before the change, and said responsive means being re-set to its original condition consequent upon its having actuated a gear change and after said alteration of the relationship between the signal and the speed of the output shaft.

2. An automatic gear change control for a transmission which includes a variable ratio gear mechanism providing at least three ratios, which control comprises an electric generator arranged to be driven from the output shaft of the transmission so that the output of the generator provides a signal which is representative of the speed of the output shaft, means responsive to the signal provided by the output of the generator and arranged to actuate the changes of gear ratio in dependence on the value of the signal, means for altering, consequent upon actuation of a gear change, the relationship between the signal and the speed of the output shaft, in the sense that, to provide a given value of the signal, the output shaft must rotate at a higher speed after an "upward" change than before the change, and must rotate at a lower speed after a "downward" change than before the change, and said responsive means being re-set to its original condition consequent upon its having actuated a gear change and after said alteration of the relationship between the signal and the speed of the output shaft.

3. An automatic gear change control as claimed in claim 2 wherein the means responsive to the signal comprise electrical relay means connected in circuit with the generator, the relationship between the value of the signal and the speed of the output shaft being altered by automatically varying the resistance in the circuit consequent upon the actuation of a gear change.

4. An automatic gear change control as claimed in claim 3, wherein as each successive upward change of gear ratio change is made, additional resistance is automatically placed in circuit with the generator and the signal responsive means, and as each successive downward change of gear ratio is made, an appropriate value of resistance is cut out of the circuit.

5. An automatic gear change control as claimed in claim 3, comprising a number of multi-position switches actuated by the signal responsive means and arranged to control the sequence of operation necessary for a change of gear ratio, said switches being operated in concert, and wherein alternate positions of the switches actuate resetting of the signal responsive means and the other alternate positions initiate changes of gear, one of said switches being arranged to alter the resistance in the generator circuit just before the re-setting of the signal responsive means.

6. An automatic gear change control as claimed in claim 5, wherein the switches are operated by a step-by-step mechanism the actuation of which to make a change of gear ratio is initiated by switch contacts under the control of said electrical relay.

7. The combination with an automatic gear change control as claimed in claim 1 of a power unit driving the input shaft of the gear mechanism and an operator actuated power control member which can be adjustably set, the relationship between the signal and the speed of the output shaft of the transmission being also altered according to the setting of the operator actuated control, settings giving greater power being arranged to cause alteration of the relationship in a sense to cause all the gear changes to be actuated at higher speeds of the output shaft as compared with settings for lower power.

8. The combination as claimed in claim 6, an electric generator connected to be driven by an output shaft of said transmission, said generator having output means for providing said signal, said signal responsive means comprising a relay, said relay and resistance means connected in circuit with said generator whereby alteration of the setting of said operator actuated power control member produces alteration of the effective impedance in said circuit.

9. The combination claimed in claim 8, wherein a number of definite settings for the operator-actuated power control member are provided, successive settings in the sense of increasing the power placing in circuit with the generator and signal responsive means respective increments of resistance, which are successively cut out of the circuit as the settings are changed in the sense of reducing the power.

10. The combination as claimed in claim 9, wherein the said resistance means having resistances and sets of contacts controlled by said operator-actuated power control member for changing the effective impedance in circuit with said generator.

References Cited in the file of this patent

UNITED STATES PATENTS

| | | |
|---|---|---|
| 2,102,598 | McDill | Dec. 21, 1937 |
| 2,182,438 | Kahn | Dec. 5, 1939 |
| 2,302,005 | Caves | Nov. 17, 1942 |
| 2,615,349 | Winther | Oct. 28, 1952 |
| 2,638,793 | Winther et al. | May 19, 1953 |
| 2,647,411 | Filocamo | Aug. 4, 1953 |